Dec. 31, 1935.  P. A. PAULSON  2,025,891
RECLAIMING BY-PRODUCTS
Filed Sept. 14, 1935
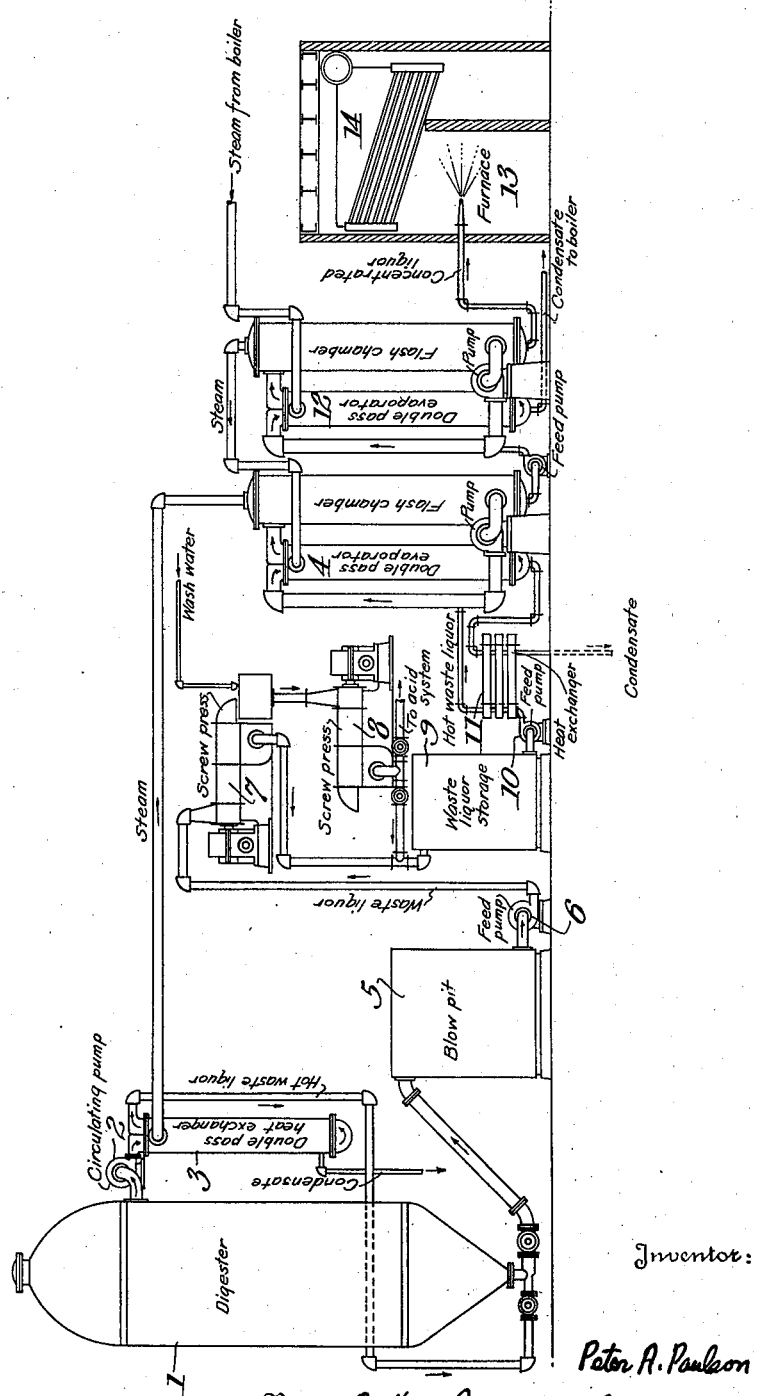
Inventor:
Peter A. Paulson
By Potter, Pierce & Schaffler
Attorneys.

Patented Dec. 31, 1935

2,025,891

UNITED STATES PATENT OFFICE 2,025,891

RECLAIMING BY-PRODUCTS

Peter A. Paulson, Appleton, Wis.

Application September 14, 1935, Serial No. 40,654

8 Claims. (Cl. 92—7)

My invention relates to a process and apparatus for reclaiming by-products arising in the production of wood pulp, particularly by the so-called sulfite process.

In the production of pulp by treating wood with dilute acid at high temperature and under pressure, to dissolve the substances incrusting the cellulose, the incrusting matter which consists mainly of lignin and other resinous matter and represents not less than about fifty percent of the wood, remains in solution in the treating liquors. These spent liquors have in the past been largely run to waste resulting not only in a public nuisance because of the pollution of rivers and the harmful effect on fish life in the streams, but also in an economic waste, because the lignin in the waste liquors has a fuel value almost equal to that of coal.

In my United States Patent No. 1,393,241 of October 11, 1921, I described a method of utilizing the waste liquor from sulfite mills whereby the liquor was drained from the pulp, the drained-off liquor was heated in an evaporator, the steam from which was passed directly into the pulp digester, the concentrated liquor was dried and the dried residue burned in a boiler to generate steam for the evaporation.

A purpose of the present invention is to provide a method and apparatus whereby a more complete recovery of the waste sulfite liquor is provided. A further purpose is to provide a method and apparatus which will more efficiently utilize the value of the waste liquor.

Other purposes will be apparent from the following description of the invention.

In the previously described process in which the waste liquor recovered was only that which drained off the pulp through a perforated bottom in the blow pit, only about 55% of the waste liquor was recovered. In the present process, by removing the liquor from the pulp by pressure filtration, for example, by means of screw presses, the recovery of the waste liquor may be increased to as high as 95%.

In the earlier proposed method, the steam generated in the waste liquor evaporator was passed directly into the pulp digester. This required ordinarily a pressure of about 110 pounds per square inch which placed a heavy duty on the evaporators and made construction expensive. In the present invention, the steam from the evaporators is conveyed to a heat exchanger where it heats by indirect exchange the cooking liquor from the digester which is circulated through the heat exchanger by means of a pump. By this means, the pressure in the evaporator can be reduced to about 40 pounds per square inch and the cost of the evaporating equipment very greatly reduced.

Instead of drying the concentrated liquor and burning the dried residue as proposed in the prior patent, I have found that the concentrated liquor may be burned directly in the boiler in spray form at a very substantial saving in equipment.

The invention will be more particularly described for the purpose of illustration with reference to the accompanying drawing which is a representation of a plant layout embodying the principles of the invention.

In the operation of the process of the invention, digester 1 is charged with wood chips and acid liquor in the manner well known in the art. During the cooking process, the acid liquor is circulated by means of pump 2 from the digester through the heat exchanger 3, where the liquor is heated by steam generated in evaporator 4, and back into the digester.

At the end of the cooking operation, the cooked pulp is blown into blow pit 5 from which it is pumped by pump 6 to screw press 7. In screw press 7, the major portion of the spent cooking liquor is removed from the pulp. The pulp from screw press 7 is then diluted, preferably with condensate from heat exchanger 3, and passed into screw press 8 where substantially all of the remaining spent liquor is removed from it.

The effluent from screw press 8 either may go to the acid plant and be used in making up cooking acid, or it may be mixed in whole or in part with the effluent from screw press 7 in order to control the consistency of the latter effluent. The effluent from screw press 7 is conducted to storage tank 9.

From storage tank 9 the spent liquor is pumped by means of pump 10 through heat exchanger 11, where it is heated by the condensate from evaporator 4. The liquor is then circulated through evaporator 4 wherein the steam required for heating the cooking liquor in heat exchanger 3 is generated at a pressure of about 40 pounds per square inch.

From evaporator 4 the liquor is circulated through evaporator 12, wherein the steam required for evaporator 4 is generated at a pressure of about 65 pounds per square inch.

Upon leaving the evaporator, the liquor will have been concentrated to a consistency of about 50 to 55% solids. The concentrated liquor is sprayed into furnace 13 where it is burned to generate in boiler 14 steam at about 150 pounds per square inch pressure in amount sufficient not only to supply the steam requirements of evaporator 12 but also steam for other purposes.

It will be seen that a process and apparatus have been provided of greatly increased efficiency and economy of operation in the recovery of waste sulfite liquor which include the removal of waste liquor from the pulp by pressure, the concentration of the liquor in an evaporator, the steam from which is used for the indirect heating of the cooking liquor in the digester, and the burning of the concentrated liquor in spray form for the generation of steam for use in the process.

I claim:

1. A method for the utilization of the values of waste sulfite liquor which comprises evaporating the liquor, heating the cooking liquor of a digester by indirect heat exchange with the steam generated in the evaporation, and generating heat for carrying out the evaporation of the waste liquor by burning the concentrated residue of the liquor.

2. A method for the utilization of the values of waste sulfite liquor which comprises expressing the liquor from the cooked pulp under pressure, evaporating the liquor, heating the cooking liquor of a digester by indirect heat exchange with the steam generated in the evaporation, and generating heat for carrying out the evaporation of the waste liquor by burning the concentrated residue of the liquor.

3. A method for the utilization of the values of waste sulfite liquor which comprises evaporating the liquor, heating the cooking liquor of a pulp digester by indirect heat exchange with the steam generated in the evaporation, and generating steam for the evaporation by burning the concentrated liquor in spray form under a boiler.

4. A method for the utilization of the values of waste sulfite liquor which comprises expressing the liquor from the cooked pulp under pressure, evaporating the liquor, heating the cooking liquor of a pulp digester by indirect heat exchange with the steam generated in the evaporation, and generating steam for the evaporation by burning the concentrated liquor in spray form under a boiler.

5. A method for the utilization of the values of waste sulfite liquor which comprises evaporating the liquor in a plurality of successive evaporators operating under successively increasing pressure, heating the cooking liquor of a pulp digester by indirect heat exchange with the steam generated in the evaporator operating under lowest pressure, heating the evaporators operating under successively lowered pressure by the steam generated in the evaporator operated under next higher pressure, and generating steam for heating the evaporator under highest pressure by burning the concentrated liquor in spray form under a boiler.

6. Apparatus for the recovery of the values of waste sulfite liquor comprising, in combination with a pulp digester, a heat exchanger, means for circulating cooking liquor from the digester through said heat exchanger, an evaporator for waste liquor, means for conveying steam from said evaporator to said heat exchanger, a boiler and means for burning concentrated liquor under said boiler.

7. Apparatus for the recovery of the values of waste sulfite liquor comprising, in combination with a pulp digester, a heat exchanger, means for circulating cooking liquor from the digester through said heat exchanger, pressure means for expressing waste liquor from cooked pulp, an evaporator for waste liquor, means for conveying steam from said evaporator to said heat exchanger, a boiler and means for burning concentrated liquor under said boiler.

8. Apparatus for the recovery of the values of waste sulfite liquor comprising, in combination with a pulp digester, a heat exchanger, means for circulating cooking liquor from the digester through said heat exchanger, an evaporator for waste liquor, means for conveying steam from said evaporator to said heat exchanger, a boiler and spray means for burning concentrated liquor under said boiler.

PETER A. PAULSON.